(12) United States Patent
Pierret

(10) Patent No.: US 7,323,103 B2
(45) Date of Patent: Jan. 29, 2008

(54) MULTIFUNCTIONAL SHUTTING DEVICE FOR LUBRICATION FILTER

(75) Inventor: Bernard Pierret, Milmort (BE)

(73) Assignee: Techspace Aero S.A., Milmort (BE)

( * ) Notice: Subject to any disclaimer, the term of this patent is extended or adjusted under 35 U.S.C. 154(b) by 0 days.

(21) Appl. No.: 11/311,857

(22) Filed: Dec. 19, 2005

(65) Prior Publication Data
US 2006/0226061 A1    Oct. 12, 2006

(30) Foreign Application Priority Data
Dec. 22, 2004   (EP) ................................ 04447287

(51) Int. Cl.
B01D 35/153   (2006.01)
B01D 27/10    (2006.01)
F01M 11/03    (2006.01)

(52) U.S. Cl. .................. 210/235; 210/130; 123/196 A
(58) Field of Classification Search ............ 123/196 R, 123/196 CP, 196 S, 196 A; 210/130, 133, 210/234, 235; 251/149.6
See application file for complete search history.

(56) References Cited

U.S. PATENT DOCUMENTS

| 3,640,390 | A  | * | 2/1972  | Goy et al. ................. 210/130 |
| 4,075,097 | A  | * | 2/1978  | Paul ....................... 210/167.02 |
| 5,744,030 | A  | * | 4/1998  | Reid et al. .................. 210/235 |
| 6,068,763 | A  | * | 5/2000  | Goddard ..................... 210/130 |
| 6,517,710 | B2 | * | 2/2003  | Hartmann et al. ..... 210/167.02 |
| 2002/0023614 | A1 | * | 2/2002 | Hartmann et al. ...... 123/196 R |
| 2003/0127384 | A1 |   | 7/2003 | Kapur |
| 2004/0238428 | A1 | * | 12/2004 | Fritze ......................... 210/234 |
| 2006/0118475 | A1 | * | 6/2006 | Girondi ..................... 210/234 |

FOREIGN PATENT DOCUMENTS

DE    201 18 682 U 1    4/2003
EP    04 44 7287        9/2005

* cited by examiner

Primary Examiner—Stephen K. Cronin
Assistant Examiner—Ka Chun Leung
(74) Attorney, Agent, or Firm—Reinhart Boerner VanDeuren P.C.

(57) ABSTRACT

A multifunctional shutting device for a lubrication filter includes a safety device with triple valve shutting. The safety device includes a first valve for closing the oil intake in the filter with a view to dismantle the filter, a second bypass valve that opens when the filter is blocked and a third valve that opens in the event of excess pressure in the hydraulic circuit. The multiple valve structure is particularly applicable to the lubrication system in an aircraft engine but can be used in other hydraulic circuits subject to similar issues.

19 Claims, 2 Drawing Sheets

MULTIFUNCTIONAL SHUTTING DEVICE FOR LUBRICATION FILTER

This patent application claims priority and the benefit of European Patent Application No. EP 04447287.6, filed Dec. 22, 2004.

FIELD OF THE INVENTION

The present invention relates to a multifunctional shutting device with valves for an oil pump belonging to the lubrication system in a aircraft engine.

The device of the invention is intended to be used in any other technical area where a hydraulic circuit must be protected against at least two of the three following phenomena: excess pressure, blockage of the filter and draining of the circuit during maintenance.

TECHNOLOGICAL BACKGROUND AND STATE OF THE ART

It is well-known that aircraft engines are lubricated by a set of pumps. Some of these, the high-pressure pumps, ensure the pressurisation of the oil taken from the tank that is then supplied to the engine components to be lubricated, for instance to the chambers of bearing supports. Other pumps, the recovery pumps, ensure the recovery of the oil collected at the low points in the engine and its return to the tank by an upstream circuit. In general, these pumps are either operated by a common shaft in a "lubrication assembly" or individually distributed in the engine. Typically, a high-pressure pump (over about ten bar) that supplies the jets and several recovery pumps on the same shaft can be found, as well as for instance an additional recovery pump for the oil from another equipment. preferably located towards the bottom of the oilpan of the lubrication assembly so as to avoid as much as possible the adverse effect on its fixings, which would be a result of the shearing forces caused by the vibration of the engine.

The lubrication assembly is generally provided with a number of safety devices in the form of valves providing adequate closing or opening. These may be of three types:
- a valve that opens in the event of excess pressure in the oil circuit;
- a bypass valve that opens when the filter is blocked;
- a valve that closes the oil intake in the filter when the latter is to be dismantled, without completely draining the lubrication circuit.

According to the prior art, each separate valve housing requires special machining in the oilpan of the lubrication assembly, which makes the shutting and filtering device bulky, complicated and expensive to manufacture.

AIMS OF THE INVENTION

The present invention aims to provide a solution that allows to overcome the drawbacks of the state of the art.

In particular, the invention aims to provide a multifunctional shutting device with valves, possibly less cumbersome, but above all lighter and less expensive to manufacture.

The invention also aims to provide a shutting device that is easy to assemble.

MAIN CHARACTERISTIC ELEMENTS OF THE INVENTION

The object of the present invention relates to a safety device by triple valve shutting, hereinafter called a multi-valve device, used in a hydraulic circuit and preferably associated to a removable filter body for a lubrication assembly in an aircraft engine.

The multi-valve device of the invention comprises:
- a first valve for closing the oil intake in the filter with a view to dismantle the filter;
- a second bypass valve that opens when the filter is blocked;
- a third valve that opens in the event of excess pressure in the lubrication assembly.

According to the prior art, each valve has its individual housing machined in an arbitrary axis which is also the opening and closing axis, depending on the available space. According to the invention, by contrast, the valves can move along a single common axis of alignment in the multi-valve device. In addition, the multi-valve device is machined en bloc from an intermediate part that is distinct from the oilpan, said distinct part being located in a single housing machined in the concentric oilpan with a symmetrical axis of the filter body that is identical to the above-mentioned axis of alignment.

Preferred embodiments of the invention are described in claims 2 to 7.

DESCRIPTION OF A PREFERRED EMBODIMENT OF THE INVENTION

Figure 1:
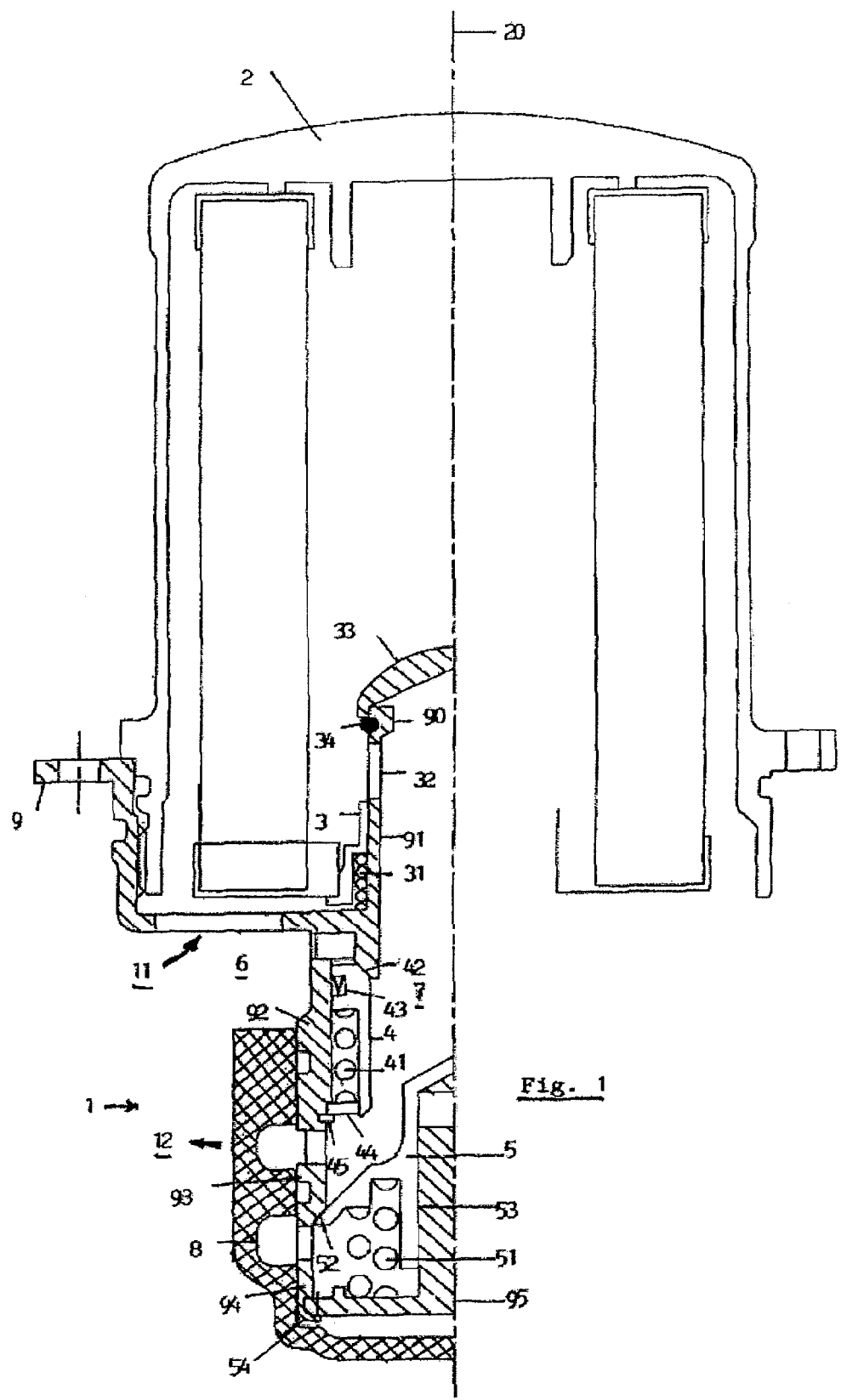
FIG. 1 diagrammatically shows a sectional view of the multifunctional shutting device with valves according to the present invention, with its filter body.

FIG. 1 shows the multifunctional shutting device with valves 1, called the multi-valve part for short, according to the present invention, with the intake and outlet channels of the oil in the filter body 2, located between the supply pump and the engine. An oil intake 11 is provided at the level of the filter and an outlet 12 is provided at the level of the multi-valve part 1.

The innovative aspect of this device is that in terms of machining, it comprises a single precise section to be manufactured on the oilpan of the lubrication assembly, into which the multi-valve part 1 is housed.

Figure 2:
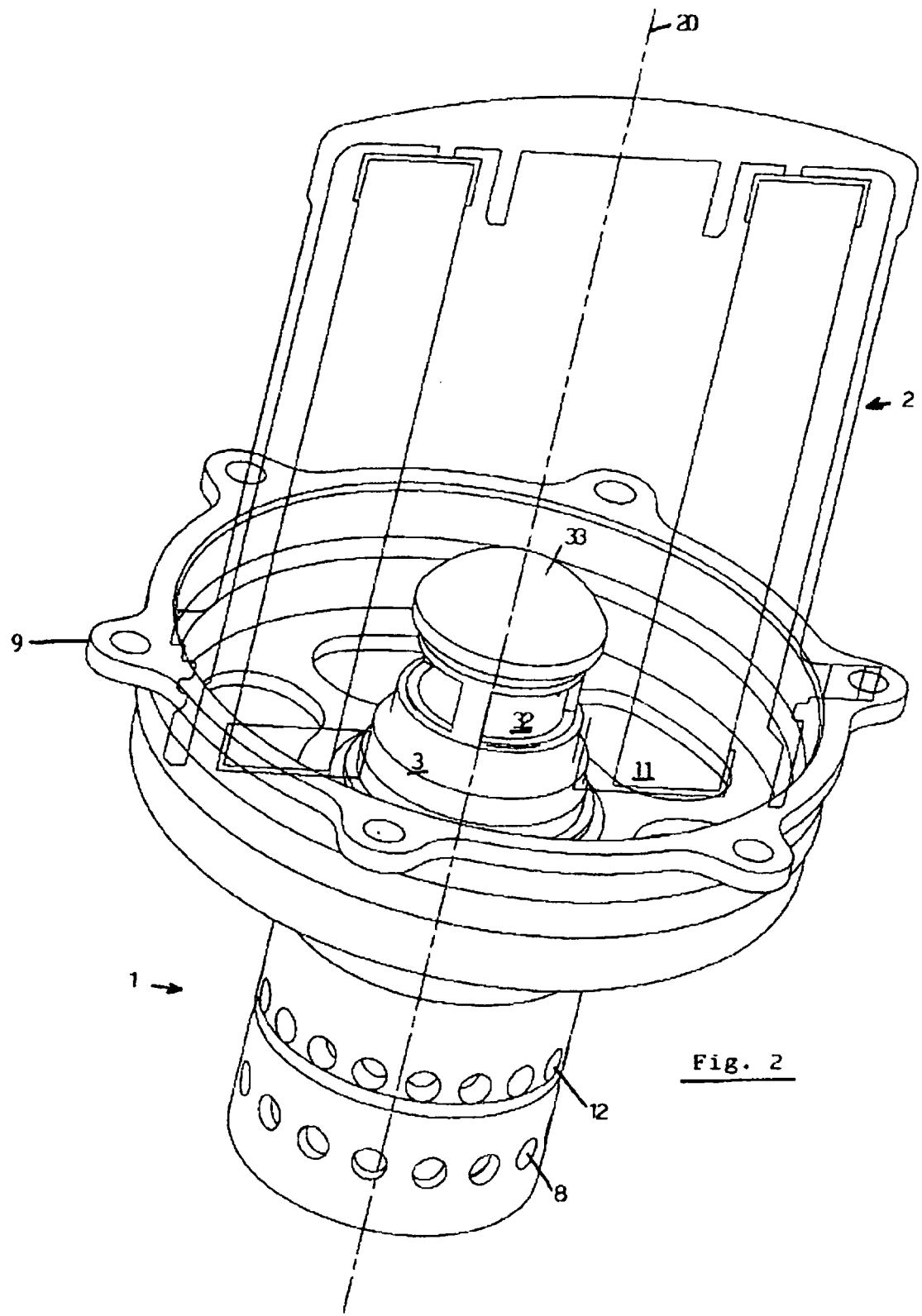
FIG. 2 diagrammatically shows a perspective view of the device of FIG. 1.

In this particular case, this device comprises three shutting valves:
- a first valve 3 of cylindrical shape, fixed to a return spring 31, blocks one or several apertures 32 provided in the lateral surface of a concentric cylinder with the filter device (axis 20). The fixed part 33, comprising in particular a dome that is referably fixed to the above-mentioned cylindrical body by a band and shown hatched in the figure, forms part of the single-block body of the multi-valve part. This first valve 3 has the role of blocking the flow of oil from the lubrication assembly towards the outside when the filter body 2 is removed, which avoids having to drain the entire lubrication circuit or even the entire engine when maintenance of the engine is being carried out or if one forgets to remount the filter after maintenance. The valve 3 moves in the axis of the valve, i.e. upwards with regard to FIG. 1, and thus shuts the aperture 32 under the action of the spring 31, when the filter body 2 is removed. The seal is ensured by an O-ring type joint 34. By contrast, the fitting of the filter body 2 moves the valve downwards (still with regard to FIG. 1), whilst at the same time unblocking the aperture 32. A different view is shown in FIG. 2;

a second bypass valve. In general, the pressure in the filter body 2 is slightly below the pressure upstream from the filter. In the event that the loss of flow becomes too great in the filter as a result for example of its blockage, a bypass oil circuit is created, the latter no longer flowing through the filter. This bypass is necessary because it is vital to ensure the continued lubrication of the engine components such as the roller bearings. The second valve 4, fixed to a preloaded spring 41 then ensures this function. This second valve shutter has a seal area, the contact area 42, which is the valve seat, as well as a dynamic joint 43, which does not obstruct the operation of the valve. The dynamic joint, which is not indispensable, has a "V" shape. Lastly, the device also comprises a spring stop 44, attached by means of a circlip 45. The operating principle is the following: when the pressure upstream from the filter 6 becomes much greater than the pressure downstream from the filter 7, the hydraulic force directed downwards on the valve 4 counters the force of the spring 41 directed upwards and the valve opens, letting oil flow towards the engine;

lastly, a third valve is active in the event of excess pressure in the entire lubrication circuit. The valve 5 fixed to a preloaded spring 51 brings the internal excess-pressure area 7 in contact with a drain 8 ensuring the return of the oil to the tank by one of the recovery pumps. The seal area is created at the level of the housing 52. Because of the excess pressure on the downstream side of the filter in particular, the downwards hydraulic force is sufficient to counter the upward force of the spring 51. Again, the fixed parts including the guide area for the valve 53 are shown hatched. It should be noted that the assembled part 54 is subjected to a very great force and therefore has to be of an appropriate size.

The multi-valve part 1 also comprises one or several collars 9 for its attachment to the oilpan of the lubrication assembly in the example shown here. In an alternative embodiment, it may also be attached to the filter. Multi-valve device 1 is advantageously made of stainless steel or aluminum.

The multifunctional shutting device with valves 1 according to the present invention is advantageously made either in the form of one single fixed part that is machined or in the form of several fixed parts, that are assembled after machining by welding, crimping, etc. In the end, one single fixed part ensures the three above-mentioned shutting functions.

The present invention has a number of major advantages over the prior art:
  a reduction in weight resulting from the machining of one single body;
  only one piece to be managed for production and administrative documents;
  only one assembly operation;
  only one concentric machining operation in the lubrication oilpan, hence the use of only one tool and greater ease of access with a reduction in machine time and therefore of manufacturing cost. In that respect, the most important benefit is gained in terms of foundry work. Indeed, having to manufacture three different valve housings according to prior art entails a very complex and hence very expensive interconnection of casting channels (compulsory use of a core box and in any event more cores in the case of three valves, difficulties especially in stripping from the mould).

The invention claimed is:

1. A multi-valve device (1), for connection to a filter body or removable filter body (2) in a hydraulic circuit, preferably a lubrication assembly, comprising an oilpan, said multi-valve device (1) comprising:
  a first valve (3) for closing the oil intake in the filter with a view to dismantle the filter;
  a second bypass valve (4) that opens when the filter is blocked;
  a third valve (5) that opens in the event of excess pressure in the hydraulic circuit; wherein the valves (3,4,5) can be moved along one single and common axis of alignment (20) in the multi-valve device (1), the latter being machined en bloc from an intermediate part that is distinct from the oilpan, said intermediate part being located in a single concentric housing machined in the oilpan so that a symmetry axis (20) of the filter body (2) is identical to the above-mentioned axis of alignment.

2. Multi-valve device (1) as in claim 1, wherein the first valve (3) is of cylindrical form, fixed to a return spring (31) and designed so as to shut one or several apertures (32) machined into the lateral surface of a concentric cylinder of said device (1), defining a fixed part (90,91,33) attached to the valve (3), the latter being capable of making a shutting or opening movement, respectively in the axis of the cylinder in order to block or unblock said aperture (32), respectively under the action of said spring (31) when the filter body (2) is removed or replaced, respectively.

3. Multi-valve device (1) as in claim 2, wherein the second bypass valve (4), in order to create an oil bypass circuit and to prevent the flow of oil in the filter body (2) in the event of the latter being blocked, is fixed to a preloaded spring (41) and defines a shutter comprising a seal area corresponding to a contact area (42), which is the seat of the valve (4) and a dynamic "V"-shaped joint (43), as well as a spring stop (44), attached by means of a circlip (45), designed so that, when the pressure upstream from the filter (6) becomes much greater than the pressure downstream from the filter (7) of the hydraulic circuit, the hydraulic force on said second valve (4) counters the force of said associated spring (41), itself being directed in the opposite direction, and said second valve (4) opens, allowing the oil to flow into a bypass circuit.

4. Multi-valve device (1) as in claim 3, wherein the third valve (5) is fixed to a preloaded spring (51) and designed so as to be active in the event of excess pressure in the entire hydraulic circuit, by bringing the internal excess pressure area (7) in contact with a drain (8) ensuring that the oil returns to another part of the hydraulic circuit, the shutter corresponding to said third valve being capable of opening at the level of a housing (52) when the hydraulic force on the valve (5) is sufficient to counter the force in the opposite direction of said associated spring (51).

5. Multi-valve device (1) as in claim 2, wherein the third valve (5) is fixed to a preloaded spring (51) and designed so as to be active in the event of excess pressure in the entire hydraulic circuit, by bringing the internal excess pressure area (7) in contact with a drain (8) ensuring that the oil returns to another part of the hydraulic circuit, the shutter corresponding to said third valve being capable of opening at the level of a housing (52) when the hydraulic force on the valve (5) is sufficient to counter the force in the opposite direction of said associated spring (51).

6. Multi-valve device (1) as in claim 2, wherein the fixed part of said multi-valve device (1) intended to be inserted in the oilpan is manufactured either in the form of one single fixed part that is directly and entirely machined or in the form of several fixed parts (33;9,90,91,92,93,94;95) assembled after machining for example by welding, crimping or with bands.

7. Multi-valve device (1) as in claim 2 that comprises several collars (9) for attaching the filter body (2) to the multi-valve part (1) and/or for attaching the multi-valve part (1) to the hydraulic circuit oilpan.

8. Multi-valve device (1) as in claim 1, wherein the second bypass valve (4), in order to create an oil bypass circuit and to prevent the flow of oil in the filter body (2) in the event of the latter being blocked, is fixed to a preloaded spring (41) and defines a shutter comprising a seal area corresponding to a contact area (42), which is the seat of the valve (4) and a dynamic "V"-shaped joint (43), as well as a spring stop (44), attached by means of a circlip (45), designed so that, when the pressure upstream from the filter (6) becomes much greater than the pressure downstream from the filter (7) of the hydraulic circuit, the hydraulic force on said second valve (4) counters the force of said associated spring (41), itself being directed in the opposite direction, and said second valve (4) opens, allowing the oil to flow into a bypass circuit.

9. Multi-valve device (1) as in claim 8, wherein the third valve (5) is fixed to a preloaded spring (51) and designed so as to be active in the event of excess pressure in the entire hydraulic circuit, by bringing the internal excess pressure area (7) in contact with a drain (8) ensuring that the oil returns to another part of the hydraulic circuit, the shutter corresponding to said third valve being capable of opening at the level of a housing (52) when the hydraulic force on the valve (5) is sufficient to counter the force in the opposite direction of said associated spring (51).

10. Multi-valve device (1) as in claim 8, wherein the fixed part of said multi-valve device (1) intended to be inserted in the oilpan is manufactured either in the form of one single fixed part that is directly and entirely machined or in the form of several fixed parts (33;9,90,91,92,93,94;95) assembled after machining for example by welding, crimping or with bands.

11. Multi-valve device (1) as in claim 8 that comprises several collars (9) for attaching the filter body (2) to the multi-valve part (1) and/or for attaching the multi-valve part (1) to the hydraulic circuit oilpan.

12. Multi-valve device (1) as in claim 1, wherein the third valve (5) is fixed to a preloaded spring (51) and designed so as to be active in the event of excess pressure in the entire hydraulic circuit, by bringing the internal excess pressure area (7) in contact with a drain (8) ensuring that the oil returns to another part of the hydraulic circuit, a shutter corresponding to said third valve being capable of opening at the level of a housing (52) when the hydraulic force on the valve (5) is sufficient to counter the force in the opposite direction of said associated spring (51).

13. Multi-valve device (1) as in claim 12, wherein a fixed part of said multi-valve device (1) intended to be inserted in the oilpan is manufactured either in the form of one single fixed part that is directly and entirely machined or in the form of several fixed parts (33;9,90,91,92,93,94;95) assembled after machining for example by welding, crimping or with bands.

14. Multi-valve device (1) as in claim 12 that comprises several collars (9) for attaching the filter body (2) to the multi-valve part (1) and/or for attaching the multi-valve part (1) to the hydraulic circuit oilpan.

15. Multi-valve device (1) as in claim 1, wherein a fixed part of said multi-valve device (1) intended to be inserted in the oilpan is manufactured either in the form of one single fixed part that is directly and entirely machined or in the form of several fixed parts (33;9,90,91,92,93,94;95) assembled after machining for example by welding, crimping or with bands.

16. Multi-valve device (1) as in claim 15 that comprises several collars (9) for attaching the filter body (2) to the multi-valve part (1) and/or for attaching the multi-valve part (1) to the hydraulic circuit oilpan.

17. Multi-valve device (1) as in claim 1 that comprises several collars (9) for attaching the filter body (2) to the multi-valve part (1) and/or for attaching the multi-valve part (1) to the hydraulic circuit oilpan.

18. Multi-valve device (1) as in claim 1, wherein the multi-valve device is made of stainless steel or aluminum.

19. Multi-valve device (1) as in claim 1, wherein the multi-valve device is in combination with an oil filter comprising a filter body (2) for a lubrication assembly in an aircraft engine.

* * * * *